(12) United States Patent
Bose et al.

(10) Patent No.: US 11,068,745 B2
(45) Date of Patent: Jul. 20, 2021

(54) DISRUPTION OF FACE DETECTION

(71) Applicant: DE-IDENTIFICATION LTD., Tel Aviv (IL)

(72) Inventors: Avishek Bose, Mississauga (CA); Parham Aarabi, Toronto (CA)

(73) Assignee: DE-IDENTIFICATION LTD., Tel Aviv (IL)

( * ) Notice: Subject to any disclaimer, the term of this patent is extended or adjusted under 35 U.S.C. 154(b) by 169 days.

(21) Appl. No.: 16/131,782

(22) Filed: Sep. 14, 2018

(65) Prior Publication Data

US 2020/0089995 A1     Mar. 19, 2020

(51) Int. Cl.
*G06K 9/00* (2006.01)
*G06K 9/62* (2006.01)
*G06T 7/70* (2017.01)

(52) U.S. Cl.
CPC ....... *G06K 9/6256* (2013.01); *G06K 9/00228* (2013.01); *G06K 9/00288* (2013.01); *G06T 7/70* (2017.01); *G06T 2207/20081* (2013.01); *G06T 2207/20084* (2013.01); *G06T 2207/30201* (2013.01)

(58) Field of Classification Search
CPC ............. G06K 9/6256; G06K 9/00228; G06K 9/00288; G06K 9/4628; G06K 9/00221; G06T 7/70; G06T 2207/20081; G06T 2207/30201; G06T 2207/20084
See application file for complete search history.

(56) References Cited

U.S. PATENT DOCUMENTS

| | | | | |
|---|---|---|---|---|
| 2015/0324633 | A1* | 11/2015 | Whitehill | G06K 9/00268 382/248 |
| 2020/0097767 | A1* | 3/2020 | Perry | G06K 9/00248 |

OTHER PUBLICATIONS

Gross, Ralph, et al. "Multi-pie." Image and Vision Computing 28.5 (2010): 807-813.
Yang, Shuo, et al. "Wider face: A face detection benchmark." Proceedings of the IEEE conference on computer vision and pattern recognition. 2016.
Kingma, Diederik P., and Jimmy Lei Ba. "Adam: A Method for Stochastic Optimization." (2015). ICLR 2015.
Akhtar, Naveed, and Ajmal Mian. "Threat of adversarial attacks on deep learning in computer vision: A survey." IEEE Access 6 (2018): 14410-14430.
Carlini, Nicholas, and David Wagner. "Towards evaluating the robustness of neural networks." 2017 IEEE Symposium on Security and Privacy (SP). IEEE, 2017.
Baluja, Shumeet, and Ian Fischer. "Adversarial transformation networks: Learning to generate adversarial examples." arXiv preprint arXiv:1703.09387 (2017).

(Continued)

*Primary Examiner* — Marcus Hammonds
(74) *Attorney, Agent, or Firm* — Pearl Cohen Zedek Latzer Baratz LLP (57) ABSTRACT

Disruption of computerized face detection includes receiving a source image that contains a representation of a face and computing a perturbation for the source image. The perturbation is specific to the source image and is configured for a target face detector. A perturbed image is then generated by adding the perturbation to the source image and then the perturbed image may be outputted instead of the source image.

28 Claims, 7 Drawing Sheets

(56) References Cited

OTHER PUBLICATIONS

Das, Nilaksh, et al. "Keeping the bad guys out: Protecting and vaccinating deep learning with jpeg compression." arXiv preprint arXiv:1705.02900 (2017).
Le, Vuong, et al. "Interactive facial feature localization." European conference on computer vision. Springer, Berlin, Heidelberg, 2012.
Messer, Kieron, et al. "XM2VTSDB: The extended M2VTS database." Second international conference on audio and video-based biometric person authentication. vol. 964. 1999.
Phillips, P. Jonathon, et al. "Overview of the face recognition grand challenge." 2005 IEEE computer society conference on computer vision and pattern recognition (CVPR'05). vol. 1. IEEE, 2005.
Dziugaite, Gintare Karolina, Zoubin Ghahramani, and Daniel M. Roy. "A study of the effect of jpg compression on adversarial images." arXiv preprint arXiv:1608.00853 (2016).
Esteva, Andre. "Dermatologist-level classification of skin cancer with deep neural networks. Enhancing the Expert." Stanford University. Slide Presentation. Jun. 8, 2017. URL: https://pdfs.semanticscholar.org/0d0e/e35c1b05868c1bc9494a202dce4b7f414370.pdf.
Schmidhuber, Jürgen. "Deep Learning in Neural Networks: An Overview." arXiv preprint arXiv:1404.7828 (2014).
Girshick, Ross. "Fast r-cnn." Proceedings of the IEEE international conference on computer vision. 2015.
Girshick, Ross, et al. "Rich feature hierarchies for accurate object detection and semantic segmentation." Proceedings of the IEEE conference on computer vision and pattern recognition. 2014.
Deng, Jia, et al. "Imagenet: A large-scale hierarchical image database." (2009): 248-255.
Moosavi-Dezfooli, Seyed-Mohsen, Alhussein Fawzi, and Pascal Frossard. "Deepfool: a simple and accurate method to fool deep neural networks." Proceedings of the IEEE Conference on Computer Vision and Pattern Recognition. 2016.
Xie, Cihang, et al. "Adversarial examples for semantic segmentation and object detection." Proceedings of the IEEE International Conference on Computer Vision. 2017.
Olah, Chris, et al. "The building blocks of interpretability." Distill 3.3 (2018): e10.
Szegedy, Christian, et al. "Intriguing properties of neural networks." arXiv preprint arXiv:1312.6199 (2013).
Papernot, Nicolas, et al. "Practical black-box attacks against machine learning." Proceedings of the 2017 ACM on Asia Conference on Computer and Communications Security. ACM, 2017.
Papernot, Nicolas, et al. "The limitations of deep learning in adversarial settings." 2016 IEEE European Symposium on Security and Privacy (EuroS&P). IEEE, 2016.
Csáji, Balázs Csanád. "Approximation with artificial neural networks." Faculty of Sciences, Etvs Lornd University, Hungary 24 (2001): 48.
Belhumeur, Peter N., et al. "Localizing parts of faces using a consensus of exemplars." IEEE transactions on pattern analysis and machine intelligence 35.12 (2013): 2930-2940.
Ramanan, Deva, and Xiangxin Zhu. "Face detection, pose estimation, and landmark localization in the wild." 2012 IEEE conference on computer vision and pattern recognition. IEEE, 2012.
Simonyan, Karen, and Andrew Zisserman. "Very deep convolutional networks for large-scale image recognition." arXiv preprint arXiv:1409.1556 (2014).
Goodfellow, Ian J., Jonathon Shlens, and Christian Szegedy. "Explaining and harnessing adversarial examples." arXiv preprint arXiv:1412.6572 (2014).

* cited by examiner

$$\text{minimize } L(x, x + \delta)$$
$$\text{s.t. } D(x + \delta) = t'$$
$$x + \delta \in [0, 1]^n$$

FIG. 5a

$$\text{minimize } L(x, x + \delta) + \lambda L_{\text{misclassify}}(x + \delta)$$
$$\text{s.t. } x + \delta \in [0, 1]^n$$

FIG. 5b

$$L_G(x, x') = \|x - x'\|_2^2 + \lambda \sum_{i=1}^{N} \cdot (Z(x'_i)_{\text{background}} - Z(x'_i)_{\text{face}})^+$$

FIG. 5c

Input:

Input Image $x$

Face Detector $D$

Generator $G$ with weights $\theta$

Object Proposals $\Phi = \{1, 2, ..., N\}$

Set of face labels for each object proposal $L_{face}$

Maximum iteration $M$

Perturbation Threshold $T$

Step Size $\alpha$

Output: Adversarial Perturbation $\delta$
initialize $m = 0$, $\delta = 0$, $L_2 = \infty$;
while $L_2 > T$ *and* $\Phi_m \neq \varnothing$ do
    $\delta = G(x)$
    $x' = \min(\max(x + \delta, 1), -1)$
    $Z(x') = D(x')$
    $\Phi_m = \mathrm{argmax}_c \{softmax(Z(x'))\}$
    $L_{misclassify} = (Z(x')_{background} - Z(x')_{face})^+$
    $L_2 = \|x - x'\|_2^2$
    $L_G(x, x') = L_2 + \lambda \cdot L_{misclassify}$
    $\theta = \theta - \alpha \nabla_\theta L_G(x, x')$
    $m = m + 1$
    if $m > M$ then
        break ;
    end
end

FIG. 7c

DISRUPTION OF FACE DETECTION

FIELD

The present invention relates to computerized face detection.

BACKGROUND

Face detection is used by various entities to detect human faces within digital images. Detection of the presence of a face or multiple faces within an image may be used for a variety of purposes, such as facial recognition.

DETAILED DESCRIPTION

People may want images of themselves or people they know to not undergo face detection. This may be for a variety of reasons. It may be the case that face detection is used in a way that is harmful. Face detection may be used to intrude on privacy or for purposes that are not agreed to by the subjects of images on which face detection is performed. Face detection may also be used on mass scale without regard to individual preferences, privileges, or rights. Face detection is a prerequisite for facial recognition, which raises similar concerns, particularly privacy and rights concerns. An individual may simply wish their likeness to be undetected and unidentified.

Figure 1:
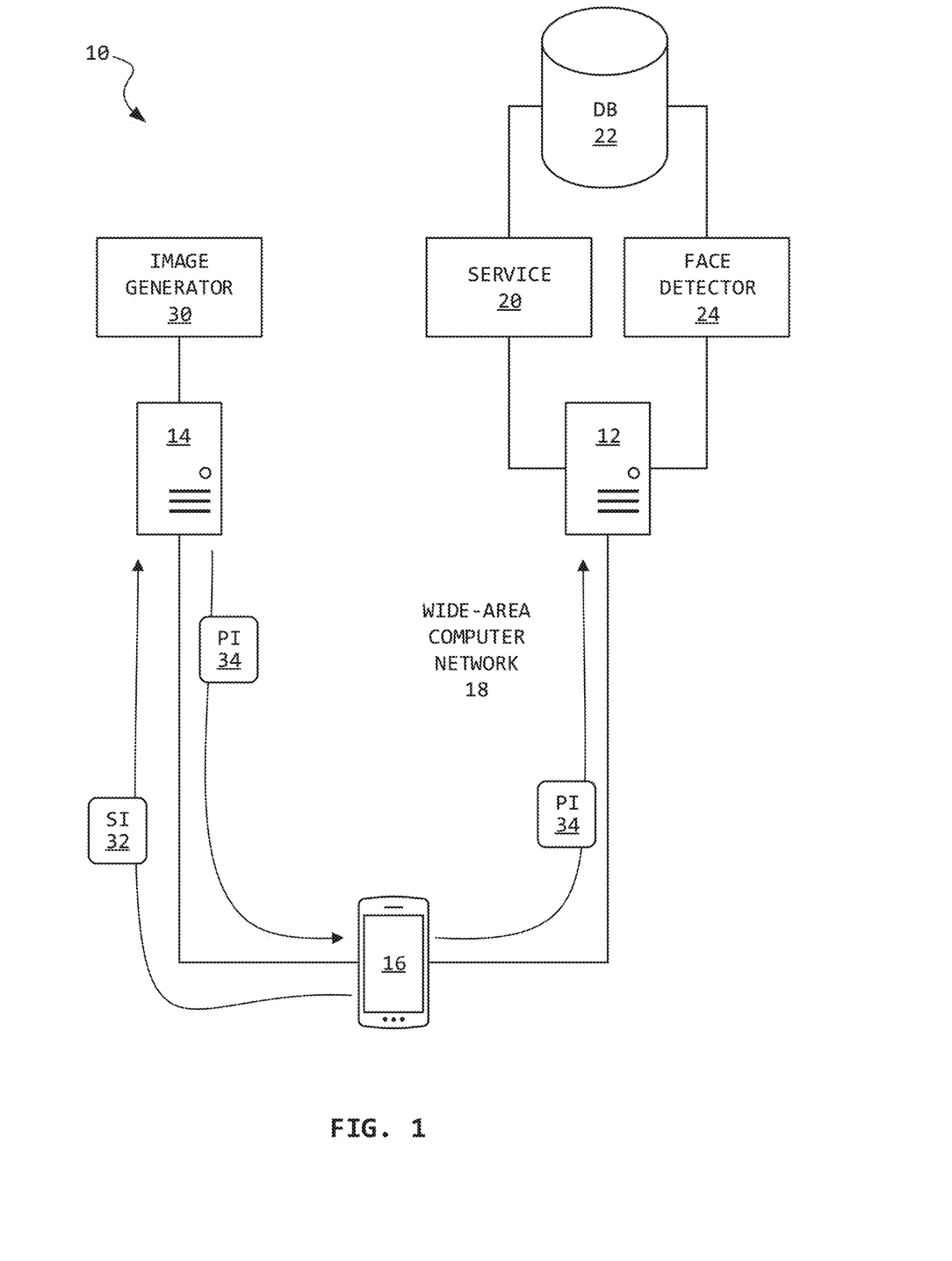
FIG. 1 is a block diagram of a system for disrupting computerized face detection.

FIG. 1 shows a networked computer system 10. The system 10 includes a target server 12 and a disruptor server 14. The servers 12, 14 are accessible to a user device 16 via a wide-area computer network 18, such as the internet. The terms "target" and "disruptor" are used for explanatory purposes only.

The target server 12 may be any kind of server 12 that provides a service 20 to a user of the user device 16. Any number of target servers 12 may be used to provide the service 20. A plurality of target servers 12 may exist to provide a plurality of services 20. Examples of services 20 include social networking, image hosting, image sharing, content management, document sharing, and document storage to name a few. In one example, the service 20 is a social network such as Facebook™, Twitter™, etc. The target server 12 may include a database 22 to store information, such as text and images, relevant to the service 20 provided. For purposes of this disclosure, image and video are equivalent, with video being, at least conceptually, a time-ordered series of images. The term "image" as used herein is intended to denote still images and frames of video.

The user device 16 may be an electronic device, such as a smartphone, notebook computer, desktop computer, tablet computer, and the like. The user device 16 may include a network interface (e.g., Wi-Fi, cellular, Ethernet chipset, etc.) to connect to the servers 12, 14 via the wide-area computer network 18. The user device 16 may include a camera to capture images, memory to store images, and a processor to execute instructions. A plurality of user devices 16 may be operated by a plurality of different users.

The target server 12 includes a face detector 24. The face detector 24 is configured to analyze an image provided to the target server 12 to detect a human face in an image. Face detection may include detecting whether a face is present in an image, counting a number of faces in an image, determining a location of a face in an image, a confidence level for a detected face (i.e., the likelihood that a detected face is actually a face), and similar information. An image determined to contain a representation of a face may be stored in the database 22 with information relevant to the detection, such as a confidence level, coordinates of the face in the image, and similar. The face detector 24 may operate according to, for example, a Faster Region-based Convolutional Neural Network (R-CNN) methodology or similar methodology.

A user device 16 may upload images to the target server 12 during the normal course of interaction by the user with the service 20. In the example of a social network, the user may upload photographs taken by the device 16 and such photographs may contain representations of faces, whether of the user or of other people. The user or the subjects of such photographs may not wish to have such photographs undergo face detection by the face detector 24 for a variety of reasons. For example, the user may simply not want the service 20 to discern any information about an image uploaded. The user may want to preserve their privacy or the privacy of the subject of an image, so the user may wish to avoid identification of people in such images. As face detection is often a precursor to facial recognition, thwarting facial recognition and the resulting loss of privacy may be effectively realized by preventing face detection.

The disruptor server 14 includes an image generator 30. The image generator 30 includes a neural network and is configured to receive a source image 32 and output a perturbed image 34. A source image 32 may be provided by a user device 16. The image generator 30 may use the source image 32 to generate the perturbed image 34 and output the perturbed image 34 to the user device 16. The perturbation provided to the source image 32 may be significant enough to prevent face detection by the face detector 24 and insignificant enough to be not readily noticeable or perceptible to the user of the device 16 or to other people.

The user of the device 16 may choose to send a source image 32 to the disruptor server 14, and then provide the perturbed image 34 to the target server 12, so as to reduce the likelihood that the face detector 24 succeeds. This may be a user-directed process or the device 16 may facilitate this automatically. For example, the device 16 may include an application to interact with the service 20 and such an application may be configured to route images through the disruptor server 14. Configuring such an application may include providing the application with a plugin that sends source images 32 to the disruptor server 14 and then sends the received corresponding perturbed images 34 to the service 20. Such operation may be made transparent to the user. The source image 32 is not sent to the service 20 and may remain on the device 16 or be deleted.

In other examples, the image generator 30 is provided to the user device 16 and the server 14 may be omitted.

The disruptor server 14 may operate according to a request-response methodology, in which a request that contains a source image 32 is provided with a response that contains the perturbed image 34. The disruptor server 14 may be a web server that communicates with a web browser at the user device 16, an application server that communicates with an application executed by the user device 16, or similar. The image generator 30 may include instructions that are executable by a processor of the disruptor server 14. Any number of disruptor servers 14 may be used to implement the image generator 30.

The image generator 30 computes a perturbation for the source image 32. The perturbation is specific to the source image 32 and is specific to the target face detector 24. The image generator 30 generates the perturbed image 34 by adding the perturbation to the source image 32. After generating the perturbed image 34, the server 14 may automatically delete the source image 32.

Figure 2:
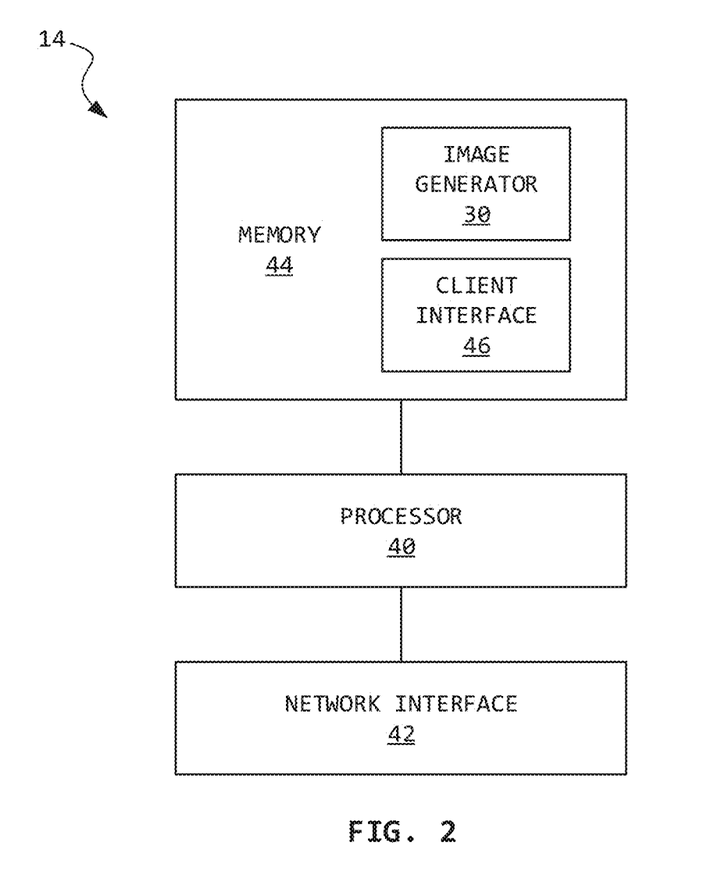
FIG. 2 is a block diagram of a disruptor server for disrupting computerized face detection.

FIG. 2 shows the disruptor server 14. The disruptor server 14 includes a processor 40, a network interface 42, and memory 44. The network interface 42 and memory 44 are connected to the processor 40. The network interface 42 may support data communications such as Ethernet, Wi-Fi, etc. communications with a computer network.

The processor 40 may include a central processing unit (CPU), a microcontroller, a microprocessor, a processing core, a field-programmable gate array (FPGA), and/or similar device capable of executing instructions. The processor 40 may cooperate with a non-transitory machine-readable medium, such as memory 44, that may be an electronic, magnetic, optical, and/or other physical storage device that encodes processor-executable instructions. The machine-readable medium may include, for example, random access memory (RAM), read-only memory (ROM), electrically-erasable programmable read-only memory (EEPROM), flash memory, a storage drive, an optical disc, and/or similar. The image generator 30 may be provided as processor-executable instructions stored in the memory 44.

The disruptor server 14 may further include a client interface 46 to facilitate communications between the image generator and a plurality of user device. The client interface 46 may include a web interface to connect the image generator 30 to a web browser at a user device. The client interface 46 may include an application interface to connect the image generator 30 to an application at a user device.

The disruptor server 14 provides for normal operations of the image generator 30 to provide perturbed images to a plurality of user devices, which may then provide perturbed images instead of source images to a service, so as to avoid face detection.

Figure 3:
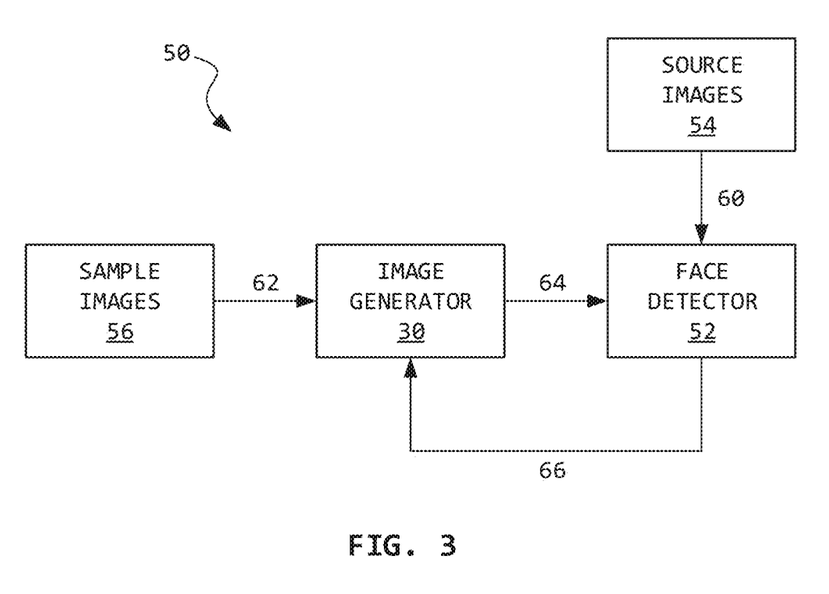
FIG. 3 is a block diagram of an image generator being trained against a face detector.

FIG. 3 shows a system 50 for creating an image generator 30. The system 50 may be considered a training system. The system 50 is operated prior to operating the image generator 30 at the disruptor server 14. The system 50 may be provided to the disruptor server 14 or to a different computer.

The image generator 30 is trained against a face detector 52, also termed a training face detector as it is used for training the image generator 30. The training face detector 52 may be an approximation of the target face detector 24 (FIG. 1). That is, the training face detector 52 may be specifically selected and configured to match the target face detector 24 as closely as practical. The training face detector 52 includes a neural network that is separate and independent from a neural network that implements the image generator 30.

Face detection schemes and their configurations are numerous and varied. Further, while some schemes are well understood or even open source, many schemes are proprietary or have proprietary components or configurations. The training face detector 52 is selected to mimic the target face detector 24 as closely as practical. In one example, the target face detector 24 is open source and trained against a standard set of images. Accordingly, the training face detector 52 may be made identical or near identical to the target face detector 24. For example, the target face detector 24 may be a Faster R-CNN detector, and so the training face detector 52 may be created according to the Faster R-CNN methodology. In another example, the algorithm used by the target face detector 24 is known or suspected, but its configuration and training images are unknown. As such, the training face detector 52 may be a rough approximation of the target face detector 24. Numerous other examples are contemplated and the accuracy of the image generator 30 depends, at least to a degree, on the matching of the training face detector 52 to the target face detector 24. A closer match improves the accuracy of avoiding face detection.

The face detector 52 may be trained 60 on a library of unperturbed source images 54. The unperturbed source images 54 may include the same images used to train the target face detector 24, if known.

The image generator 30 is trained against the face detector 52. Training of the image generator 30 may include providing 62 sample images 56 to the image generator 30. The sample images 56 may be similar or identical to the source images 54. The image generator 30 may be trained the same time the face detector 52 is trained. That is, the same image 56 may be provided to the image generator 30 and the face detector 52 in sequence.

The image generator 30 perturbs a sample image 56 to generate a perturbed image that is provided 64 to the training face detector 52. The training face detector 52 then operates on the perturbed image to classify the perturbed image as containing a face or not. Classification may also include a quantity of faces detected, a confidence level for a detected face, a location of a face in the perturbed image, and so on.

Information related to the classification performed by the training face detector 52 is provided to the image generator 30 as feedback 66. The image generator 30 takes a misclassification of a sample image 56 as positive or reinforcing feedback. That is, if the training face detector 52 fails to detect a face in a particular perturbed sample image 56, the image generator 30 identifies the applied perturbation as effective. Conversely, if the training face detector 52 does detect a face in a particular perturbed sample image 56, the image generator 30 identifies the applied perturbation as ineffective. A degree of ineffectiveness may be taken as proportional to a number of faces detected and a confidence level for a detected face. Negative feedback 66 may also be provided in the form of a similarity between the unperturbed sample image 56 and the perturbed image provided to the training face detector 52. That is, small perturbations are encouraged while large perturbations, which result in large (and likely human perceptible) differences between source and perturbed images, are penalized. As such, over the course of a batch of sample images 56, the image generator 30 learns perturbations that will cause the training face detector 52 to fail and that will still appear similar to the original image, at least to the human eye.

The image generator 30 is contemplated to perturb pixels largely in a face region of an image. Thus, an abstract concept of a face is modeled to allow generalization to new instances of faces.

Figure 4:
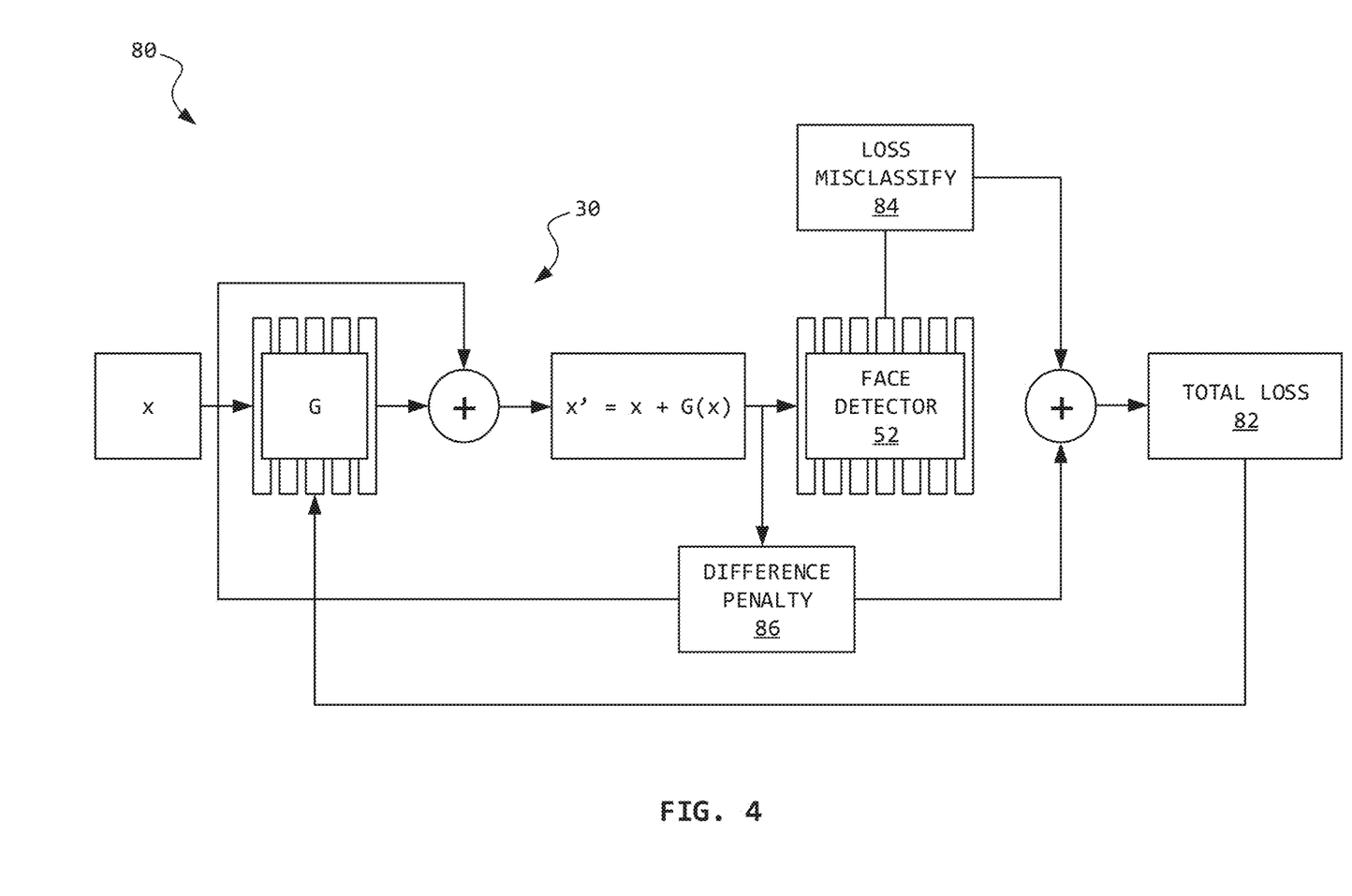
FIG. 4 is a block diagram of an image generator being trained against a face detector with specific loss components.

FIG. 4 shows a training system 80 for creating an image generator 30. The system 80 may be similar to the other training systems described herein, such as that shown in FIG. 3.

The system 80 includes the image generator 30 being trained against a face detector 52.

The image generator 30 may generate a perturbation using a conditional generator neural network G that is updated in tandem with the face detector 52. The network G produces a small perturbation that can be added to an input image x to produce a perturbed image x'. The face detector 52 need not be made aware of the network G. A loss signal 82 is fed back to the network G. The loss signal 82 quantifies how well the network G can "fool" the face detector 52 into misclassifying the perturbed image x' as not containing a face.

The loss signal 82 includes contributing losses 84, 86. A classification loss 84 represents the face detector 52 detecting a face in a perturbed image x'. The classification loss 84 may be proportional to a quantity of faces detected, a confidence level, and so on. The loss signal 82 further includes a difference penalty 86, or $L_2$ norm cost, that is based on the difference between the perturbed image x' and the source image x. A larger difference may incur a larger difference penalty 86 for the perturbation. The loss signal 82 as a whole may be considered negative feedback for the perturbation. A larger loss signifies a less useful perturbation.

The difference penalty 86 may also be used to inform the image generator 30 as to a degree of difference that is suitable. That is, the difference penalty 86 may be fed back to the image generator 30 for the image generator 30 to use when determining a next perturbation.

Over time, the generator network G produces perturbations that can effectively fool the contemporaneously trained face detector 52. Once fully trained, the network G can be used to generate image-conditional perturbations with a simple feed-forward operation. That is, the image generator 30 can be disconnected from the training face detector 52 and used to generate perturbed images 34 (FIG. 1) during post-training normal operations. Using the neural network G to produce such perturbations means that, during normal operations, creating a perturbed image is at most a forward pass. This is significantly faster than other approaches, such as a Fast Gradient Sign Method (FGSM). Further, the training provided by the system 80 is generalized so that optimization is performed over a set of sample images x used for training, rather than on a per-image basis. This allows for generalization to new unseen images x without further optimization steps.

A given image x used to train the image generator 30 may be cycled through the system 80 any number of times. A greater number of cycles may reduce the perceptibility of the perturbation in the resulting perturbed image x', while still causing the face detector 52 to misclassify the perturbed image x' as lacking a face.

The generator network G may be trained end-to-end via gradient based optimization, backpropagating through the face detector 52 whose weights remain fixed while updating the weights of the generator network G.

Figure 5A:
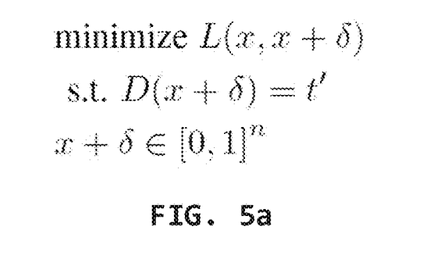
FIG. 5a is an expression for minimizing a loss to an image caused by adding a perturbation to the image to overcome face detection.
Figure 5B:
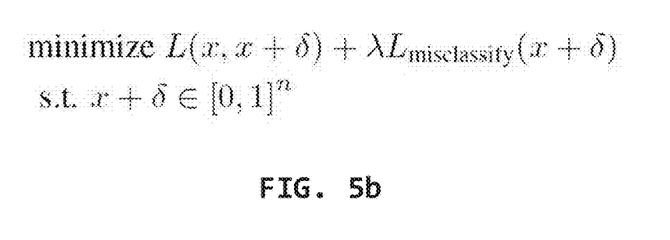
FIG. 5b is a simplified expression for minimizing a loss to an image caused by adding a perturbation to the image to overcome face detection.

As discussed above, the image generator 30 may be trained based on a loss signal 82 that is a sum of the misclassification loss 84, which urges the generator G to generate perturbations that lead to failure of the face detector 52, and a difference penalty 86, which urges the perturbations to be small. With reference to the expression shown in FIG. 5a, a loss L is to be reduced or minimized. Loss L may be a suitable norm, such as difference penalty 86 or loss $L_2$, that enforces similarity between original and perturbed images. D, δ, and t' respectively represent the trained face detector 52, the generated perturbation, and the background class for the detector. The constraint $D(x+\delta)=t'$ is highly non-linear due to the detector D being a neural network. This constraint may thus be moved to the objective function as a penalty term for violating the original constraint, as shown in FIG. 5b. This new expression for loss L is to be reduced or minimized. Specifically, a penalty may be ascribed for each of the perturbed images x' that is correctly, but undesirably, detected as a face. The nonlinear constraint is removed and added as a penalty with a constant λ>0, which balances the magnitude of the perturbation generated against the objective of the image generator 30 to cause failure in an actual target face detector.

Figure 5C:
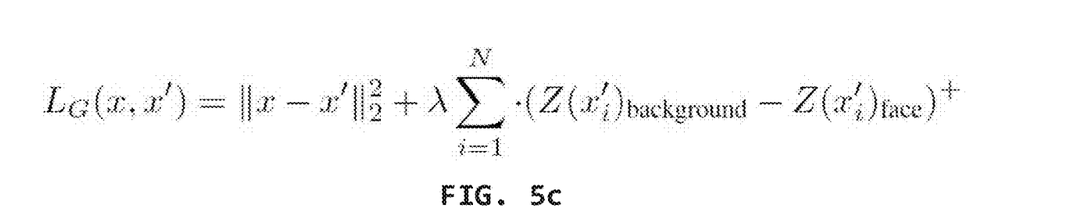
FIG. 5c is an expression for total loss based on a difference penalty and a misclassification loss.

When this constant, or hyperparameter, λ is selected to be very small (e.g., 10e-4), perturbed images x' are very similar to original images x and therefore often incapable of triggering failure in the face detector 52. On the other hand, when λ is selected to be very large (e.g., 10), this leads to perturbed images x' that have large perturbations that are readily apparent to humans. Selecting an appropriate misclassification loss 84 may provide robustness to the choice of constant λ. A value of the constant λ of 10e-2 may provide for stable training and perturbations that are sufficient to fool the face detector 52. Thus, the total loss $L_G$ on the generator network G may be expressed as shown in FIG. 5c, where Z(x') is the unnormalized score of a specific class, such as background portions of an image or a face in the image, in object proposal i out of N total proposals in the perturbed image, and where $(x)^+$ denotes the maximum of x and 0 or max(x, 0). It is useful to perform multiple gradient steps on the same sample image, for example to convergence, before optimizing for the next sample image.

Figure 6:
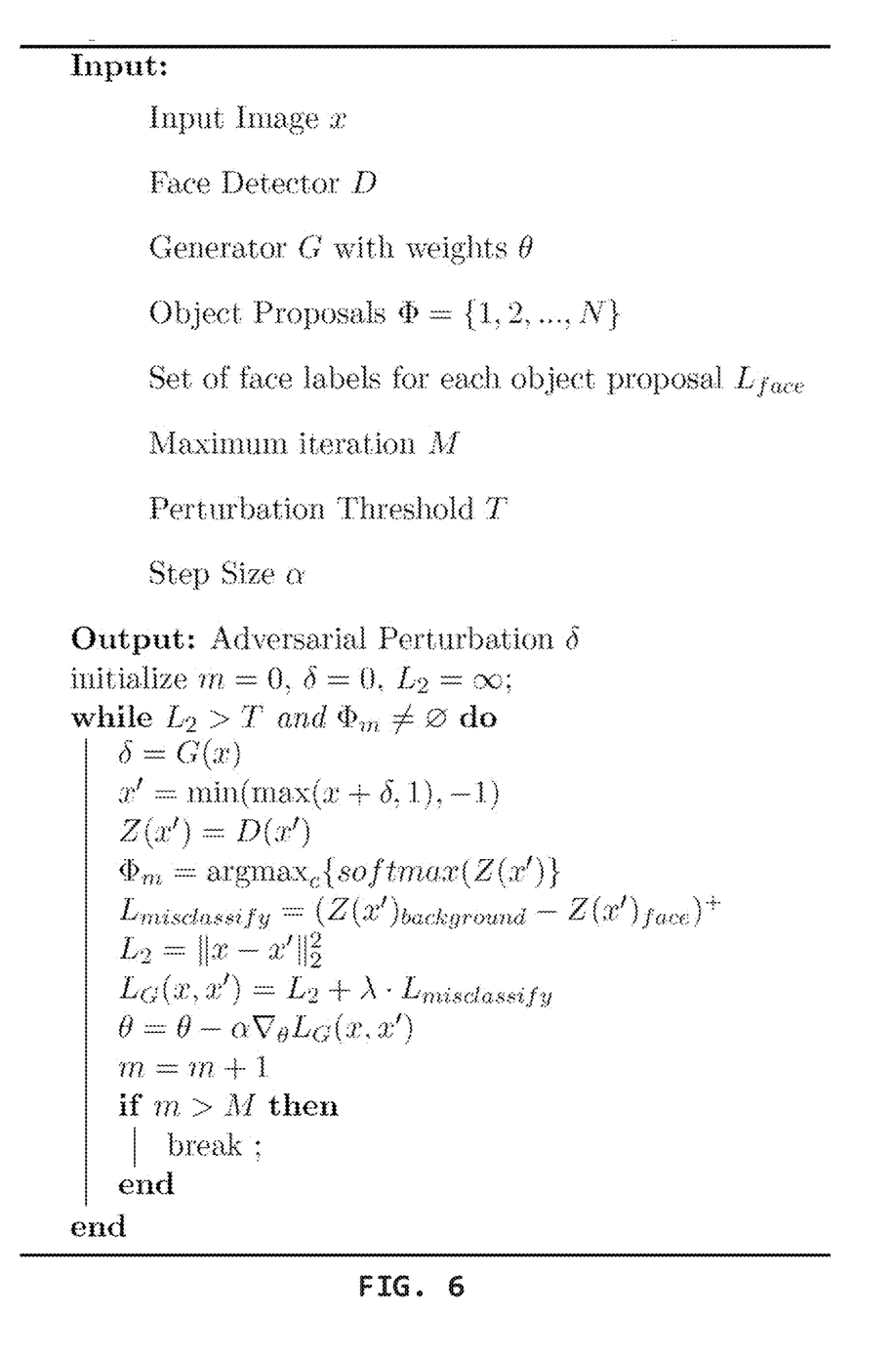
FIG. 6 is a pseudocode listing of a process to add a perturbation to an image to overcome face detection.

FIG. 6 shows pseudocode for a process to train an image generator 30. As can be seen, during a loop while a difference penalty, or loss $L_2$, is greater than an acceptable perturbation threshold T (e.g., an acceptable risk of perception by a human) and while proposed objects (i.e., portions of background and faces) are identified by a training face detector 52 as present in a perturbed image x', a loss signal $L_G$ is computed for a perturbed image x' and coefficients θ of the generator network G are updated. The loss signal $L_G$ is based on a proportioned summing of a misclassification loss, which considers scores for background and face for various objects detected in the perturbed image x', and a difference loss $L_2$, which quantifies how different the perturbed image x' is from the original image x. The coefficients θ of the generator network G are updated proportionally to a step size and the loop terminates after a configurable number of iterations.

The loop condition that proposed objects are identified by a training face detector 52 as present in a perturbed image x' may apply a normalized exponential function ("softmax") and an arguments of the maxima ("argmax") function. An example softmax function accepts unnormalized scores for each class, i.e., a score for face and background classes.

Then, the softmax function normalizes the scores into probabilities that sum to 1. For example, the probability of an object belonging into the face class may be 0.7 and the probably that the object belongs to the background class may be 0.3. An example argmax function is then taken over these values to identify which class has the highest probability. In this simplified example, 0.7>0.3 and hence the argmax function would indicate that the object belongs to the face class, which signifies that a face has been detected in a particular region of the image. The loop is repeated until the object proposals returned by the argmax and softmax functions indicate no faces, and such iterations may be limited to a maximum number.

Figure 7A:
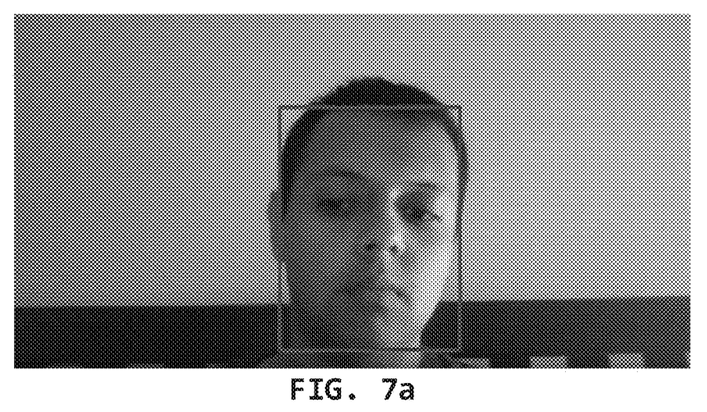
FIG. 7a is an unperturbed image undergoing face detection.
Figure 7B:
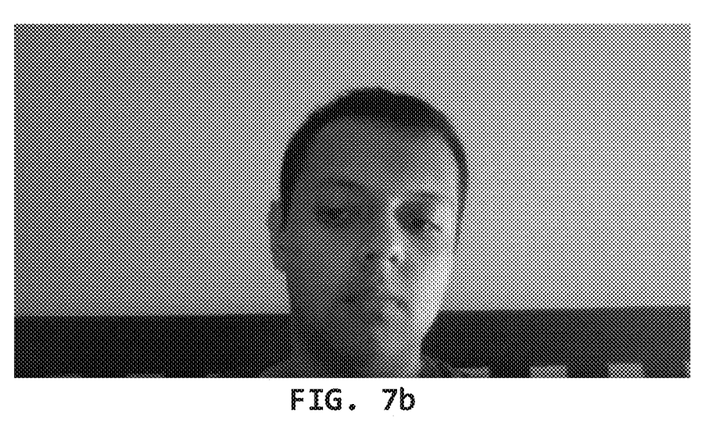
FIG. 7b is a perturbed image avoiding face detection.
Figure 7C:
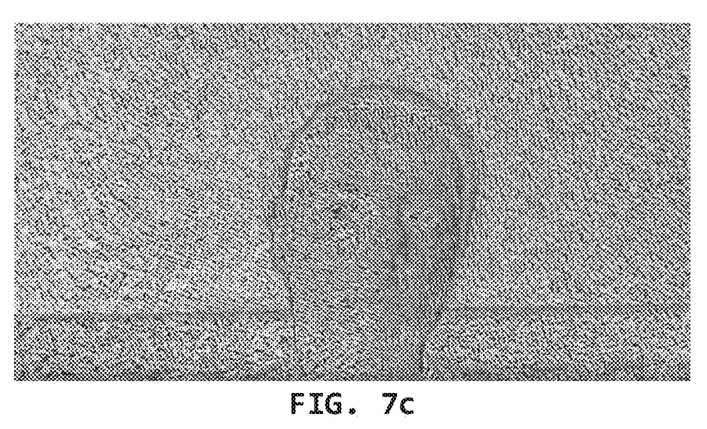
FIG. 7c is a representation of a perturbation added to the image of FIG. 7a to obtain the image of FIG. 7b.

FIGS. 7a-7c show still images obtained from a video implementation of the techniques described herein. FIG. 7a shows an example image undergoing face detection. The image is an original image that is not perturbed. When face detection was performed on the image of FIG. 7a, the face was detected, as indicated by the box. FIG. 7b shows the image after perturbation has been applied by an image generator, as described herein. When face detection was performed on the image of FIG. 7b, the face was not detected. FIG. 7c shows a visual representation of the perturbation added to the original image of FIG. 7a to arrive at the perturbed image of FIG. 7b.

It should be apparent from the above that face detection may be disrupted by adding small perturbations to images that contain faces. Perturbations may be computed to cause failure of a face detector and to reduce the likelihood that a perturbation will be visible to human observers. An image generator may be used to apply perturbations to images and the image generator may be trained with an approximation of the face detector. Video rates of processing may be achieved.

It should be recognized that features and aspects of the various examples provided above may be combined into further examples that also fall within the scope of the present disclosure.

We claim:

1. A system for disrupting computerized face detection, the system comprising an image generator and a first face detector, wherein the image generator is configured to:
    receive one or more first images that contain a representation of a face;
    compute a perturbation for the one or more first images; and
    generate one or more second perturbed images by adding the perturbation to the one or more first images,
and wherein the first face detector is configured to:
    classify the one or more second, perturbed images; and
    provide information related to the classification to the image generator as feedback information, to prevent face detection by the first face detector.

2. The system of claim 1, wherein the image generator is trained against the first face detector.

3. The system of claim 2, wherein the image generator is trained based on misclassification of perturbed images by the first face detector.

4. The system of claim 2, wherein the image generator is trained based on difference between perturbed images and source images.

5. The system of claim 2, wherein the image generator is trained based on constrained optimization of misclassification of source images by the first face detector and of differences between perturbed images and source images.

6. The system of claim 2, wherein the first face detector is an approximation of a second face detector.

7. The system of claim 2, wherein the first face detector is trained on a library of unperturbed source images.

8. The system of claim 2, wherein the image generator comprises a neural network and the first face detector comprises a separate and independent neural network.

9. The system of claim 1, wherein the image generator provides only a forward pass to compute and generate the perturbed image from the source image.

10. The system of claim 1, further comprising a server to execute the image generator.

11. The system of claim 10, wherein the server comprises a communications interface to receive the source image via a computer network and to output the perturbed image via the computer network.

12. The system of claim 10, further comprising a web interface to connect the image generator to a plurality of web browsers of a plurality of user computer devices via a computer network.

13. The system of claim 10, further comprising an application interface to connect the image generator to a plurality of applications of a plurality of user computer devices via a computer network.

14. A method of training an image generator, the method comprising:
    providing one or more first images that contain a representation of a face to the image generator;
    computing, by the image generator, a perturbation for the one or more first images;
    generating, by the image generator, one or more second, perturbed images by adding the perturbation to the one or more first images
    classifying, by a first face detector, the one or more second, perturbed images; and
    providing information related to the classification to the image generator as feedback information, to train the image generator to prevent face detection by the first face detector.

15. The method of claim 14, further comprising training the image generator against the first face detector.

16. The method of claim 15, further comprising training the image generator based on a classification loss of the first face detector.

17. The method of claim 15, further comprising training the image generator based on a difference penalty representative of a difference between the perturbed image and the source image.

18. The method of claim 15, further comprising training the image generator based on constrained optimization of misclassification of source images by the first face detector and of differences between perturbed images and source images.

19. The method of claim 15, wherein the first face detector is an approximation of second face detector.

20. The method of claim 15, wherein the image generator comprises a neural network and the first face detector comprises a separate and independent neural network.

21. The method of claim 14, wherein the classification information is selected from a list consisting of: whether a perturbed image contains a face, a quantity of faces detected in a perturbed image, a confidence level for a detected face in a perturbed image and a location of a face in a perturbed image.

22. The method of claim 14, further comprising:
    if the feedback information comprises failure to detect a face in an image of the one or more second, perturbed images, then identifying the perturbation as effective; and if the feedback information comprises detection of a face in an image of the one or more second, perturbed images, then identifying the perturbation as ineffective.

23. The method of claim 21, wherein the classification information further comprises similarity between a first image of the one or more first images and a second image of the one or more second, perturbated images, and wherein training the image generator further comprises penalizing large differences between the first image and the second, perturbated image.

24. The method of claim 14, wherein the image generator comprises a generator neural network configured to compute the perturbation, and wherein the generator neural network is trained in tandem with the first face detector.

25. The method of claim 24, wherein training the generator neural network in tandem with the first face detector comprises:
   producing, by the generator neural network, a perturbation;
   adding the perturbation to an input image X, to produce a perturbed image X';
   calculating a loss signal, corresponding to how well the generator neural network "fools" the first face detector into misclassifying the perturbed image X' as not containing a face; and
   feeding the loss signal back to the generator neural network as negative feedback for the perturbation.

26. The method of claim 25, wherein the loss signal comprises: (a) a difference penalty that is based on the difference between input image X the perturbed image X' and (b) a classification loss, representing detection of a face in perturbed image X' by the first face detector.

27. A method of disrupting computerized face detection, the method comprising:
   receiving a source image that contains a representation of a face; and
   perturbing the source image by an image generator, and outputting the perturbed image,
wherein the image generator is trained to generate the perturbed image by:
   providing one or more sample images to the image generator;
   perturbing the one or more sample images by the image generator, to produce one or more perturbed images;
   classifying, by a first face detector, the one or more perturbed images; and
   using the classification as feedback for the image generator, to prevent face detection by a second face detector.

28. The method of claim 27, wherein the second face detector is an open source detector, trained against a standard set of images, and wherein the method further comprises initially training the first face detector to mimic the second face detector.

* * * * *